Patented Apr. 6, 1954

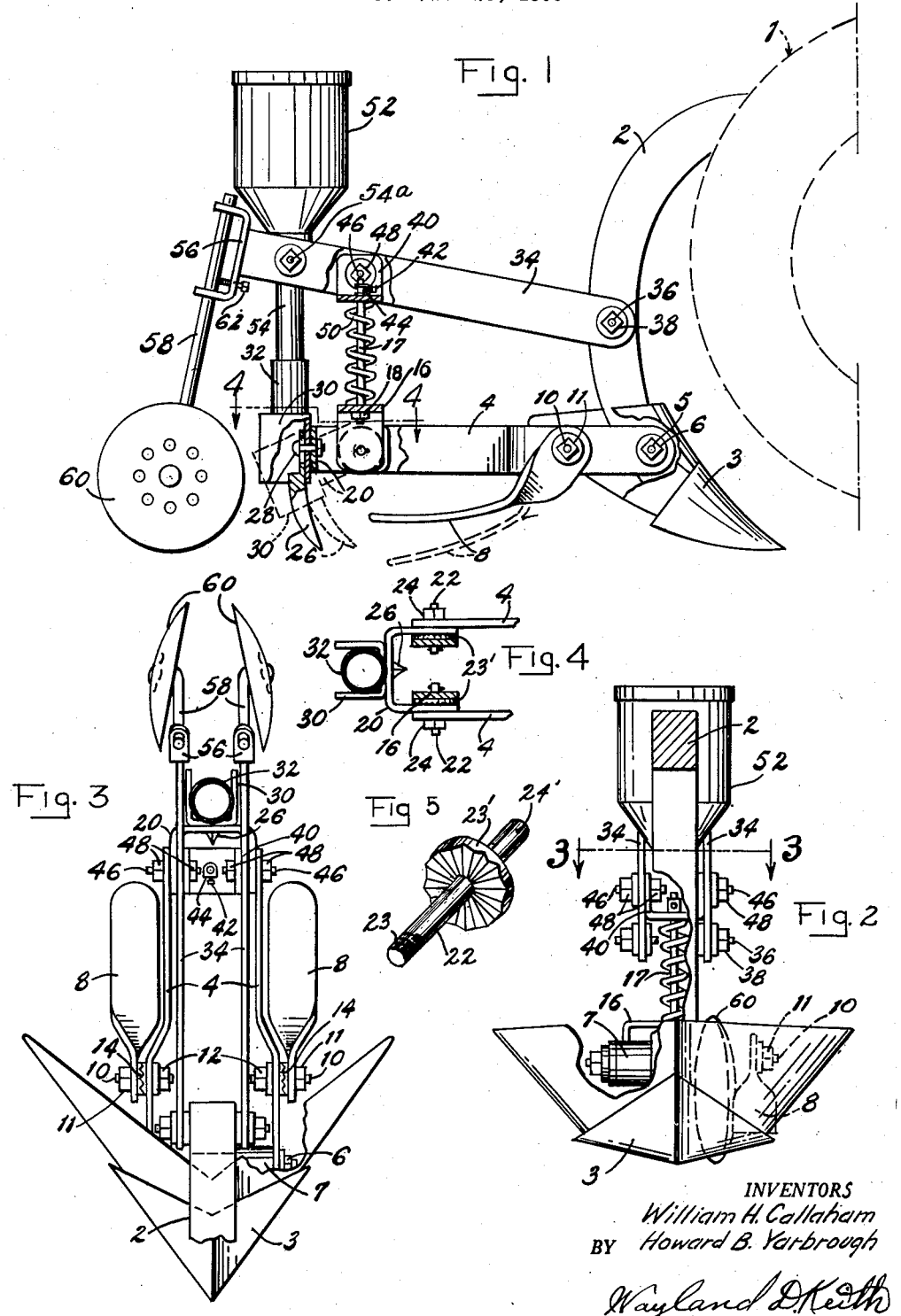

2,674,212

UNITED STATES PATENT OFFICE 2,674,212

SEED PLANTING DEVICE

William H. Callaham and Howard B. Yarbrough, Rochester, Tex.

Application January 28, 1950, Serial No. 141,144

2 Claims. (Cl. 111—83)

1

This invention relates to a variable depth seed planting device, and more particularly to a seed planting device adapted to be used as an attachment for bedders and planters, whereby the depth of planting of the seed can be adjusted, and will remain constant under varying conditions of use of the implement.

The invention has for its principal object the provision of a variable depth planting device which is readily adjustable for any desired depth of planting, and which, when once adjusted, assures the planting of the seed at a constant depth regardless of variations in the condition of the soil or irregularities in the contour of the area being planted, such as ridges, humps, hollows, and the like.

Another object of the invention is the provision of a variable depth planting device in the form of an attachment readily applied to various types of standard bedders and planters, without the necessity of making substantial changes in the structures of such implements.

A further object of the invention is to provide a planting device of the kind referred to wherein the angular position of the sub-soiler can be readily adjusted to any desired inclination independently of the depth of penetration of the sub-soiler.

A further object of the invention is the provision of a variable depth planting device employing a bottom plow and sub-soiler which are independently adjustable for depth, and when so adjusted cooperate to assure a uniform depth of furrow and a constant depth of planting of the seed over a wide range of variations in the consistency of the soil and the conditions under which the planting operation is carried out.

A still further object of the invention is to provide a variable depth planting device of simple design and rugged construction having a few parts which are likely to get out of order, or become broken under the extreme conditions of wear and rough usage to which such implements are customarily subjected.

The invention will best be understood from the following description constituting a specification of the same, when taken in conjunction with the annexed drawings wherein—

Fig. 1 is a side elevational view partly broken away and partly in section of the invention, showing the same as attached to a tractor and indicating the relationship between the various parts;

Fig. 2 is an end elevation of the invention looking at the breaking plow end of the structure as seen in Fig. 1;

2

Fig. 3 is a plan view, partly in section, taken along the line 3—3 of Fig. 2, looking in the direction indicated by the arrows; and Fig. 4 is a fragmentary cross-sectional view taken along the line 4—4 of Fig. 1, looking in the direction indicated by the arrows, showing structural details of the attachment and manner of adjustment of the subsoiler; and Fig. 5 is a somewhat detached perspective view of a fastening device by which certain parts of the structure are adjustably fastened together.

Referring to the drawings in greater detail the planting device of the invention is shown in Fig. 1 as applied to a tractor, generally indicated at 1, of conventional construction, having one or more shanks 2 associated with the power lift mechanism of the tractor, so the entire mechanism of the planting device can be raised or lowered out of or into engagement with the ground.

A bottom plow 3 of usual construction is attached to the shank 2 adjacent its lower end, and behind the plow 3 a pair of arms 4 are secured to the shank by a bolt 5 extending through an opening in the shank and provided with a nut 6. Spacers 7, in the form of short sleeves, may be positioned over the bolt 5 to properly space the arms 4 from the shank 2.

Each of the arms 4 carries a runner 8, secured thereto by a bolt 10 and nuts 11 and 12, for the purpose of limiting the downward movement of the arms 4 toward the ground. Star washers 14, or the like, are positioned between the runners 8 and the arms 4, so that by loosening the nuts 11 and 12 the runners may be adjusted up or down with respect to the arms 4, and when the nuts have been tightened the runners will be rigidly held in adjusted positions.

Between the arms 4, adjacent their rear ends, an inverted U-shaped bracket 16 is attached, which bracket extends upwardly above the arms and is perforated to receive a threaded rod 17 secured by a nut 18 to the bracket, for a purpose later to be made apparent.

A bracket 20, of U-shape, has its arms connected with the arms 4, outside of the bracket 16. The fastening device shown in Fig. 5 comprises a bolt 22 having a threaded portion 23 at one end and a star washer 23' rigidly mounted midway of its length. The serrated face of the washer 23' is held in engagement with the inner face of the bracket 20 by nut 24 to maintain this bracket in adjusted position against the arm 4. Lateral holes 24' are provided near the inner ends of bolts 22 to receive cotter pins for retaining the bracket 16 on the bolts for free rocking or turning movement thereon. A sub-soil plow 26 is adjustably secured to the bracket 20, and may be provided with a vertical slot through which a bolt 28 passes, to permit vertical adjustment of the plow with respect to the bracket. A U-shaped guide or housing 30 is also carried by the bracket 20, the arms of the guide extending rearwardly to receive a portion 32 of a seed-tube located to deposit seeds immediately behind the sub-soil plow 26.

At a point above the arms 4 on the shank 2, a pair of rearwardly extending arms 34 are pivotally secured by a bolt 36 and nuts 38, so that the arms 34 extend rearwardly above the arms 4 and are spaced therefrom.

Between the arms 34, above the U-shaped bracket 16 another U-shaped bracket 40 is attached, which is perforated and through which the rod 17 extends. A set screw 42 carried by a yoke 44 positioned on the rod 17 serves to adjustably secure the rod to the U-shaped bracket 40. The arms of the U-shaped bracket 40 are secured to the arms 34 by means of bolts 46 provided with nuts 48 so that the bracket is pivotally secured to the arms. A coil spring 50, or the like, is positioned about the rod 17 between the brackets 16 and 40, to retain the arms 34 spaced from the arms 4, and to cushion relative movement between the upper and lower pairs of arms.

A seed hopper 52, having a downwardly extending tube portion 54 telescoping into the tube portion 32, is pivotally secured adjacent the outer ends of the arms 34 by bolt 54a, as seen in Fig. 1, whereby seeds can be distributed behind the sub-soil plow in the customary manner.

At the outer end of each of the arms 34 a generally vertically positioned U-shaped bracket 56 is secured, the arms of which are perforated to receive the shanks 58 of disc coverers or similar devices 60 which may be of any conventional type positioned behind the sub-soil plow 26, for the purpose of covering the seed when distributed. A set screw 62 is provided in each of the brackets 56, whereby the shank 58 can be held in any adjusted position therein, in order that the disc coverer may be adjusted at any desired elevation with respect to the arms 34 and the sub-soil plow 26.

As many of the planting devices as may be convenient or desirable may be applied to the planter, only one such device being illustrated in the drawing for the purpose of illustrating the invention.

In making use of the invention as described above, the mechanism is moved into engagement with ground by operation of the power lift mechanism of the tractor, and the sub-soil plow is adjusted for depth by adjusting the runners 8 in the manner previously described. The sub-soil plow is likewise adjusted for depth by loosening the bolt 28 and moving the plow upwardly or downwardly on the bracket, after which the bolt 28 is again tightened to retain the plow securely in adjusted position. The bracket 20 is also adjusted in its angular relation to the arms 4, by loosening the nuts 23 and 24, swinging the bracket 20 to the desired position, and retightening the nuts. In this manner the angle of penetration of the sub-soil plow 26 may be adjusted for most efficient operation in soils of different density, hardness or moisture content, as well as the depth of the furrow which will be made by this plow.

The disc coverers 60 are then adjusted to the most efficient operating position with relation to the bottom and sub-soil plows, in the manner previously described.

During the planting operation the bottom plow 3 penetrates the soil to form a relatively wide furrow, and the depth to which the seeds are planted is controlled by the sub-soil plow 26 whose depth of penetration is regulated by the positions of the runners 8. As the mechanism is moved forward the soil is broken by the bottom plow 3, after which the sub-soil plow 26 forms a seed furrow of predetermined depth, into which the seeds are deposited from the hopper 52. The disc coverers then cover the seed furrow and the planting operation is completed.

It will be noted that the arms 4 are capable of upward and downward movement about the bolt 5 on the shank 2, so that regardless of irregularities which may be encountered in the vertical contour of the soil, the seeds will always be planted at a constant depth with relation to the surface of the soil. Moreover, the arms 4 are capable of moving upwardly with relation to the arms 34, by compression of the spring 50, so that the sub-soil plow can readily adjust itself to variations in the vertical contour of the ground, without otherwise disturbing the relationship between the various parts of the mechanism.

Should it be necessary to turn the tractor around at the end of a row, or at some other point, the entire planting mechanism can be elevated by operation of the power lift mechanism of the tractor, whereupon the bottom plow 3 and the sub-soil plow 26 are raised out of engagement with the soil, until the tractor has been turned around, and is in position to start the next row.

It will be noted that due to the connection between the arms 4 and the arms 34 by the rod 17 the downward movement of the arms 4 with relation to the arms 34 is limited, and the relationship between the various parts will be maintained when the mechanism is elevated with the shank 2, so that when the device is again lowered into engagement with the ground the planting can be resumed under the same conditions, and uniformity of depth of planting is assured.

Thus the invention provides a variable depth seed planting device of very flexible character, capable of use with a wide variety of different types of soil, and adjustable to assure the uniform planting of seed crops of all kinds under any practical conditions of operation likely to be encountered.

While the invention has been described in connection with a particular embodiment of the same, it will be understood that numerous changes may be made in the structure and arrangement of the various parts, without departing from the spirit of the invention or the scope of the appended claims.

Having thus clearly shown and described the invention what is claimed as new and desired to secure by Letters Patent is:

1. In a constant depth seed planting device, a bottom plow having a shank, upper and lower pairs of rearwardly extending laterally spaced supporting arms pivotally secured to said shank for vertical swinging movement relative to each other, a sub-soil plow supported by said lower pair of arms, ground engaging means carried by said lower pair of arms disposed between said bottom plow and said sub-soil plow for varying the depth of penetration of said sub-soil plow, coverer means carried by said upper pair of arms and spaced rearwardly of said sub-soil plow, a seed hopper and seed delivery means carried by said upper pair of arms and arranged to discharge seeds between said sub-soil plow and said coverer means, and means connecting said pairs of arms, said connecting means including stop means limiting the vertical separation of said pairs of arms, and spring means urging said pairs of arms apart.

2. In a constant depth seed planting device, a bottom plow having a shank, upper and lower pairs of rearwardly extending laterally spaced supporting arms pivotally secured to said shank for vertical swinging movement relative to each other, a sub-soil plow supported by said lower pair of arms, ground engaging means supported on said lower pair of arms by means providing for adjusting said ground engaging means vertically with respect to said lower arms, said ground engaging means disposed between said bottom plow and said sub-soil plow for varying the depth of penetration of said sub-soil plow, coverer means carried by said upper pair of arms and spaced rearwardly of said sub-soil plow, a seed hopper pivotally mounted on said upper pair of arms, seed delivery means connected to said hopper and arranged to discharge seeds between said sub-soil plow and said coverer means, means limiting the separation of said pairs of arms and means yieldably resisting movement of the pairs of arms toward each other.

References Cited in the file of this patent

UNITED STATES PATENTS

| Number | Name | Date |
|---|---|---|
| 804,105 | Doolen | Nov. 7, 1905 |
| 842,623 | Carrell | Jan. 29, 1907 |
| 882,751 | Edwards | Mar. 24, 1908 |
| 1,084,307 | Altgelt | Jan. 13, 1914 |
| 1,259,826 | Bloom | Mar. 19, 1918 |
| 1,453,553 | Gallagher | May 1, 1923 |
| 2,318,224 | Hyland | May 4, 1943 |
| 2,416,189 | McIntyre | Feb. 18, 1947 |

FOREIGN PATENTS

| Number | Country | Date |
|---|---|---|
| 464,914 | Germany | Aug. 29, 1928 |
| 602,513 | Germany | Sept. 10, 1934 |